United States Patent [19]

Murata et al.

[11] Patent Number: 4,817,748

[45] Date of Patent: Apr. 4, 1989

[54] INDUSTRIAL VEHICLE EQUIPPED WITH ELECTRICALLY POWERED POWER STEERING SYSTEM

[75] Inventors: Kazuo Murata; Shigeru Togo; Masamichi Furuta, all of Tokyo, Japan

[73] Assignee: Nissan Motor Co., Ltd., Yokohama, Japan

[21] Appl. No.: 92,520

[22] Filed: Sep. 3, 1987

[30] Foreign Application Priority Data

Sep. 6, 1986 [JP] Japan ................................ 61-210358

[51] Int. Cl.$^4$ ............................................. B62D 5/04
[52] U.S. Cl. ................................... 180/79.1; 180/291; 180/65.1
[58] Field of Search ...................... 180/79.1, 291, 65.1, 180/298, 299, 69.24

[56] References Cited

U.S. PATENT DOCUMENTS 3,933,224  1/1976  Nilsson et al. ...................... 180/298
4,270,625  6/1981  Nishimura et al. ................. 180/291
4,331,209  5/1982  Bauer et al. ......................... 180/65.1

FOREIGN PATENT DOCUMENTS 60-144572  9/1985  Japan .

*Primary Examiner*—Charles A. Marmor
*Assistant Examiner*—Donn McGiehan
*Attorney, Agent, or Firm*—Foley & Lardner, Schwartz, Jeffery, Schwaab, Mack, Blumenthal & Evans

[57] ABSTRACT

Herein disclosed is a steerable industrial vehicle equipped with an electrically powered power steering system. A cargo-handling motor is housed in a box which is positioned near an electric motor of the electrically powered power steering system. The box is formed at its inboard side wall with a rectangular opening through which the electric motor is viewed from the outside of the vehicle. With the provision of the rectangular opening, checking and/or replacement of brushes of the electric motor can be easily carried out.

11 Claims, 4 Drawing Sheets 4,817,748

INDUSTRIAL VEHICLE EQUIPPED WITH ELECTRICALLY POWERED POWER STEERING SYSTEM

BACKGROUND OF THE INVENTION

1. Field of the Invention

The present invention relates in general to an industrial vehicle equipped with a power steering system, and more particulary to an industrial vehicle, such as an electric forklift truck or the like, which is equipped with an electrically powered power steering system.

2. Description of the Prior Art

Because of easiness with which maintenace can be carried out, some of the power steering systems mounted on industrial vehicles are of an electric type wherein an electric motor is used for amplifying the torque applied at the steering wheel by the driver. One of the conventional power steering systems of such electric type is disclosed in Japanese Utility Model First Provisional Publication No. 60-144572. However, hitherto, the arrangement of such electrically powered power steering system relative to the vehicle body has been given little thought. In fact, due to the inherency in construction of such power steering system, the electric motor thereof has been inevitably placed at a narrow space in the vehicle body where maintenance work for the motor is very difficult. In fact, hitherto, it has been necessary to dismantle the battery unit and/or the driver's seat from the vehicle body when checking or replacing the brushes (or sliding contacts) of the electric motor becomes necessary. This dismantling work has been not only troublesome but also very dangerous.

SUMMARY OF THE INVENTION

It is therefore an essential object of the present invention to provide an industrial vehicle equipped with an electrically powered power steering system, which vehicle is free of the above-mentioned troublesome and dangerous dismantling work even when checking or replacing of the brushes of the motor is necessary.

According to the present invention, there is provided a steerable industrial vehicle having a vehicle body, which comprises an electrically powered power steering system mounted in the vehicle body and including an electric motor which produces a power for amplifying the torque applied at a steering wheel; a cargo-handling motor mounted in the vehicle body at a position near the power steering electric motor, the cargo-handling motor producing power for handling a cargo; a box mounted in the vehicle body and housing therein the cargo-handling motor, the box including an inboard side wall facing the power steering electric motor, an outboard open side facing the outside of the vehicle and a lower wall securely mounted on the vehicle body; first means for detachably connecting the cargo-handling motor to the lower wall of the box; and second means defining in the inboard side wall of the box an opening through which the power steering electric motor is viewed from the outside of the vehicle.

DETAILED DESCRIPTION OF THE INVENTION

Figure 1:
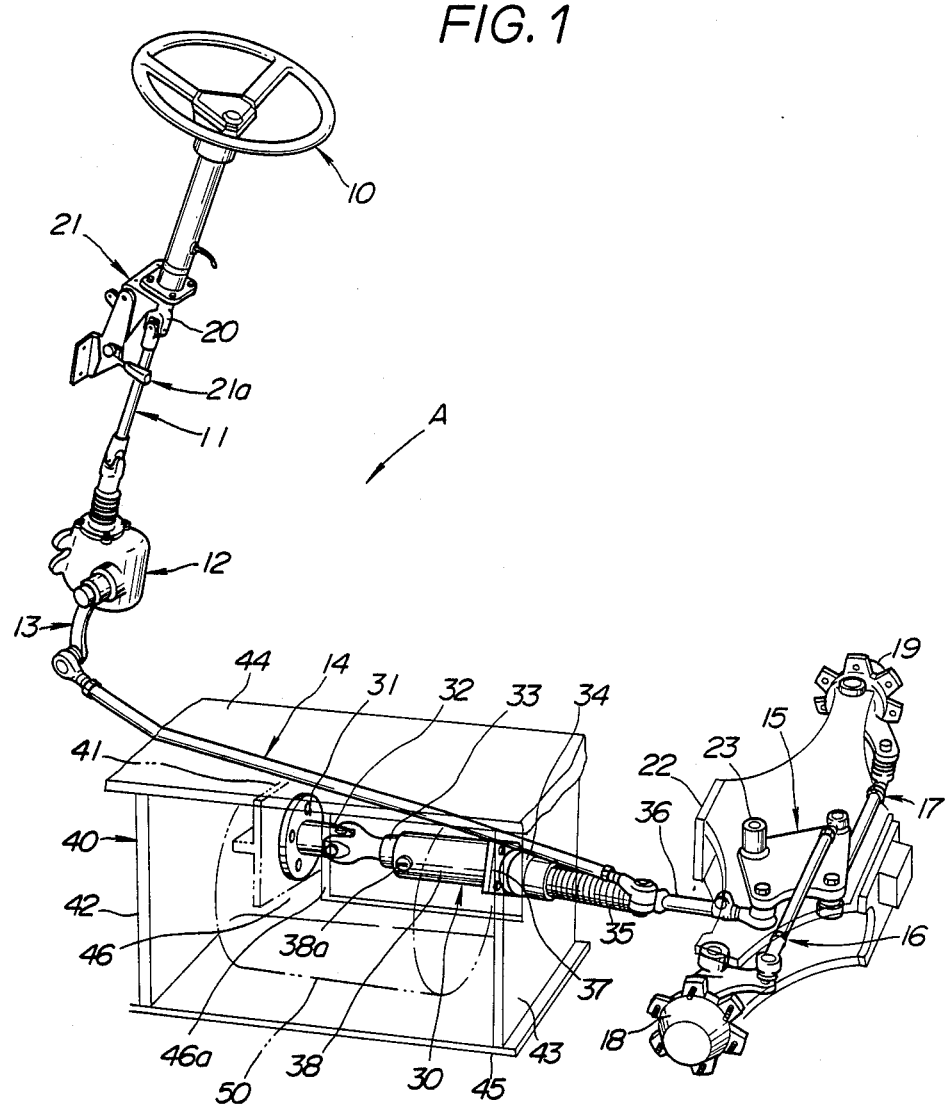
FIG. 1 is a perspective view of an electrically powered power steering system equipped in an industrial vehicle, viz., an electric forklift truck, which has an improved parts-arrangement according to the present invention.

Referring to the attached drawings, particularly FIG. 1, there is shown an electrically driven power steering system "A" which is mounted in an industrial vehicle, viz., electric forklift truck, which has an improved parts-arrangement according to the present invention. The system "A" comprises a steering wheel 10, a steering shaft 11, a steering gear 12, a pitman arm (drop arm) 13, a drag rod 14, a bellcrank 15, tie rods 16 and 17, and axle hubs 18 and 19.

The steering shaft 11 is equipped with a universal joint 20 with which a tilt mechanism 21 is associated. Designated by numeral 21a is a lock lever for locking the tilt mechanism 21.

The drag rod 14 is pivotally connected at one end thereof to the pitman arm 13 and at the other end thereof to a power screw rod 36 of a power assist mechanism 30 which will be described hereinafter. That is, the other end of the drag rod 14 is connected to the bellcrank 15 through the power screw rod 36.

The bellcrank 15 is pivotally connected to an axle center housing 22 through a bellcrank pin 23.

Although not shown in the drawings, steered wheels are respectively connected to the axle hubs 18 and 19.

As is seen from FIG. 1, the power assist mechanism 30 is associated with the drag rod 14 through the power screw rod 36 thereof. The power assist mechanism 30 comprises a mounting base 31, a universal joint 32 connected at its one end to the mounting base 31, a power screw tube 33 connected to the other end of the universal joint 32, a power assist housing 34 housing therein the power screw tube 33, a dust cover 35 covering a part of the power screw rod 36, a motor mounting flange 37 and an electric motor 38 mounted on the flange 37. The electric motor 38 will be referred to as a power steering motor in the following. Although not well shown in the drawing, the power steering motor 38 is connected to the power screw tube 33 as if it is a branch of the tube 33.

Figure 2:
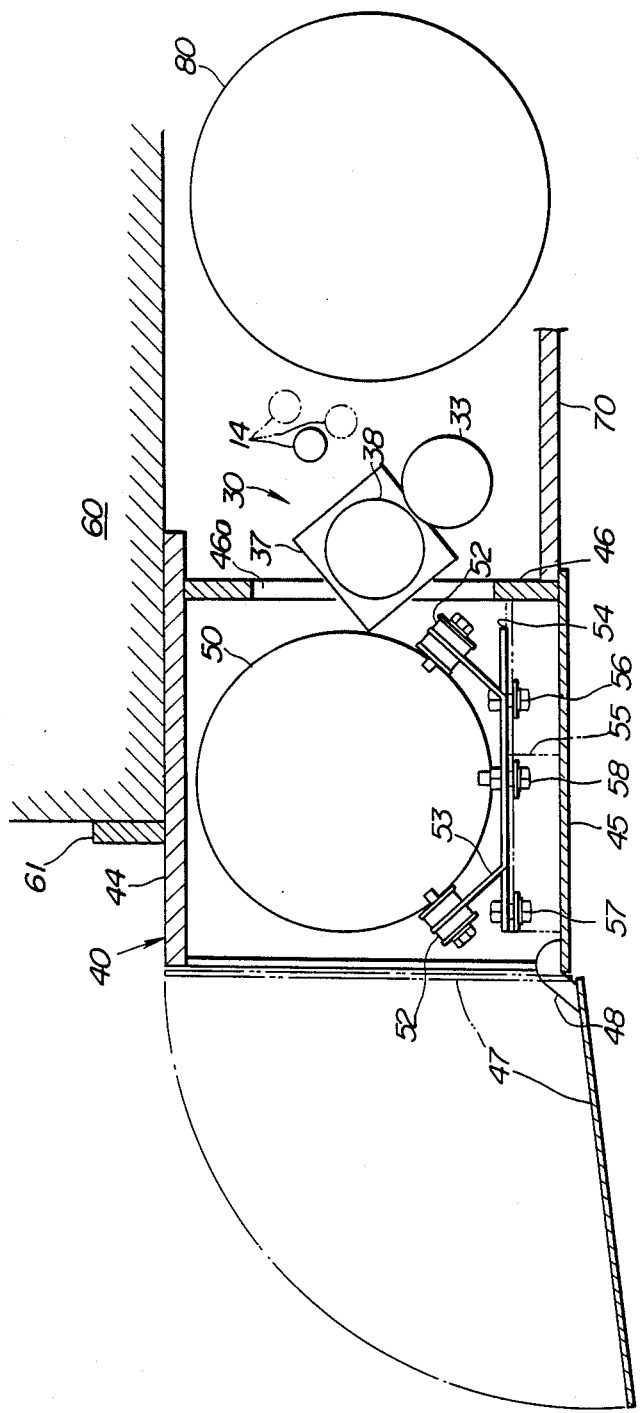
FIG. 2 is a, sectional view of an essential part of the parts-arrangement.

The mounting base 31 is bolted to a rear surface of a motor box 40 which will be described in detail hereinafter. With the provision of the universal joint 32, the power screw tube 33, the power steering motor 38 and their associated parts can follow lateral movements of the drag rod 14 which inevitably occur upon steering of the vehicle. This will be understood from FIG. 2 wherein major three positions of the drag rod 14 are illustrated. That is, the position illustrated by a solid line is taken by the drag rod 14 when the vehicle is moving straight, the position illustrated by a dot-dash line is taken when the vehicle is turning to the right and the position illustrated by a dot-dot-dash line is taken when the vehicle is turning to the left. Designated by numeral 50 in FIG. 2 is an electric motor which produces a power for handling a cargo, which will be thus referred to as a cargo-handling motor in the following. Although, in the drawing, the motor flange 37 and the cargo-handling motor 50 are illustrated as if they contact each other, they are positioned apart from each other in the fore-and-aft direction of the vehicle in order to avoid their mutual interference.

Referring back to FIG. 1, the power screw rod 36 is housed in both the power screw tube 33 and the power assist housing 34. The rod 36 is formed with a ball screw groove (not shown), so that an assist power produced by the power steering motor 38 is transmitted to the power screw rod 36 through a reduction gear, a screw ball case and screw balls which are not shown in the drawing.

The motor mounting flange 37 to which the power steering motor 38 is bolted is connected to the power screw tube 33 with an inclination of about 45 to 50 degrees with respect to the axis of the power screw tube 33. The power steering motor 38 has at a housing thereof a brush holder 38a which is screwed into the housing. The brush holder 38a holds thereon brushes (or sliding contacts) projected into the motor 38. Thus, when replacement of the brushes becomes necessary, the brush holder 38a is screwed out from the housing of the motor 38.

Designated by numeral 80 in FIG. 2 is an electric motor for driving the vehicle, which will be thus referred to as a vehicle driving motor in the following. In order to provide a sufficient space between the vehicle driving motor 80 and the cargo-handling motor 50 for arranging the drag rod 14 therebetween, the power steering motor 38 is arranged diagonally with respect to the power screw tube 33.

In the following, the layout of the power assist mechanism 30 with respect to the vehicle body will be described with reference to FIGS. 1 to 3.

As is seen from FIG. 2, the motor box 40, the cargo-handling motor 50, a battery unit 60, a center cross member 70 and the vehicle driving motor 80 are arranged near the power assist mechanism 30.

As is best seen from FIGS. 1 and 2, the motor box 40 houses therein the cargo-handling motor 50 and comprises front and rear walls 42 and 43, upper and lower walls 44 and 45 and an inboard side wall 46. The outboard side of the box 40 is opened. The inboard side wall 46 is formed with a rectangular opening 46a through which the brush holder 38a of the power steering motor 38 is viewed from the outside. The opening 46a is so sized as to permit manipulation for dismantling and mantling the brush holder 38a from and to the motor 38. As is seen from FIG. 2, a rectangular lid 47 is pivotally connected to the outboard open side of the motor box 40 through hinges 48. Although not shown in the drawing, a suitable catch member is fixed to the free end of the lid 47 for allowing the lid 47 to keep its closed position relative to the box 40, as is illustrated by the dot-dot-dash line.

Figure 3:
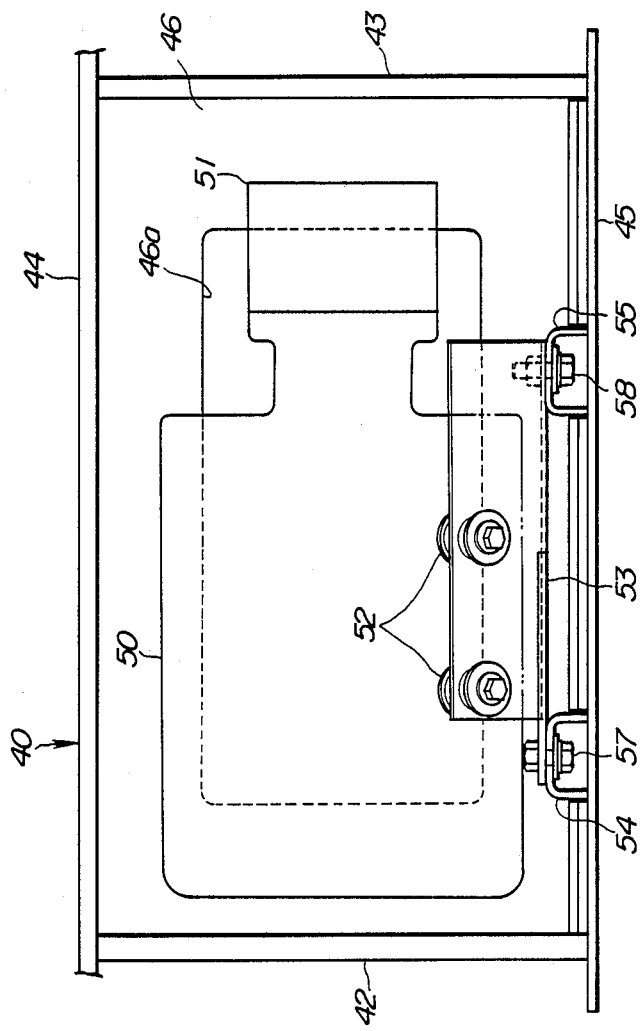
FIG. 3 is a side view of the essential part, which is taken from the direction of the outside of the vehicle.

As is seen from FIG. 3, the cargo-handling motor 50 is received in the motor box 40. Designated by numeral 51 is a gear pump which is connected to a rear portion of the motor 50. As is best seen from FIG. 2, the motor 50 is mounted on the lower wall 45 of the motor box 40 through a mounting device. As is seen from FIGS. 2 and 3, the mounting device comprises two channel members 54 and 55 which are secured to longitudinally spaced portions of the lower wall 45 of the motor box 40 in a manner to extend across the same. An enlarged supporting bracket 53 is secured to the channel members 54 and 55 by means of three bolts 56, 57 and 58 and their associated nuts. That is, a front portion of the bracket 53 is secured to the front channel member 54 by means of the bolts 54 and 55 and their associated nuts, while, a rear portion of the bracket 53 is secured to the rear channel member 55 by means of the bolt 58 and its associated nut. The bracket 53 has side portions (no numerals) raised upwardly. As is seen from FIG. 3, each raised side portion of the bracket 53 is equipped with two mount insulators 52 each, as is seen from FIG. 2, including a shock absorbing member interposed between the cargo handling motor 50 and the raised side portion and a bolt connecting the shock absorbing member with the motor 50. Thus, it will be appreciated that by disconnecting the bolts 56 and 57 from their associated nuts, the motor mounting bracket 53 can be turned outwardly about the bolt 58.

The battery unit 60 supplies powers to electric devices which include the vehicle driving motor 80, the cargo-handling motor 50 and the power steering motor 38. As is seen from FIG. 2, the battery unit 60 is placed above the power assist mechanism 30, the motor box 40 and the vehicle driving motor 80. A suitable support frame 61 is arranged to tightly support thereon the battery unit 60.

The center cross member 70 extends across the vehicle body to serve as not only a reinforcing member of the vehicle body but also a protecting member for the power assist mechanism 30. As is seen from FIG. 2, one end of the center cross member 70 is secured to the inboard side wall 46 of the motor box 40.

The vehicle driving motor 80 is arranged at a generally middle portion of a vehicle frame, so that the same is placed at an inboard side with respect to the power assist mechanism 30.

Figure 4:
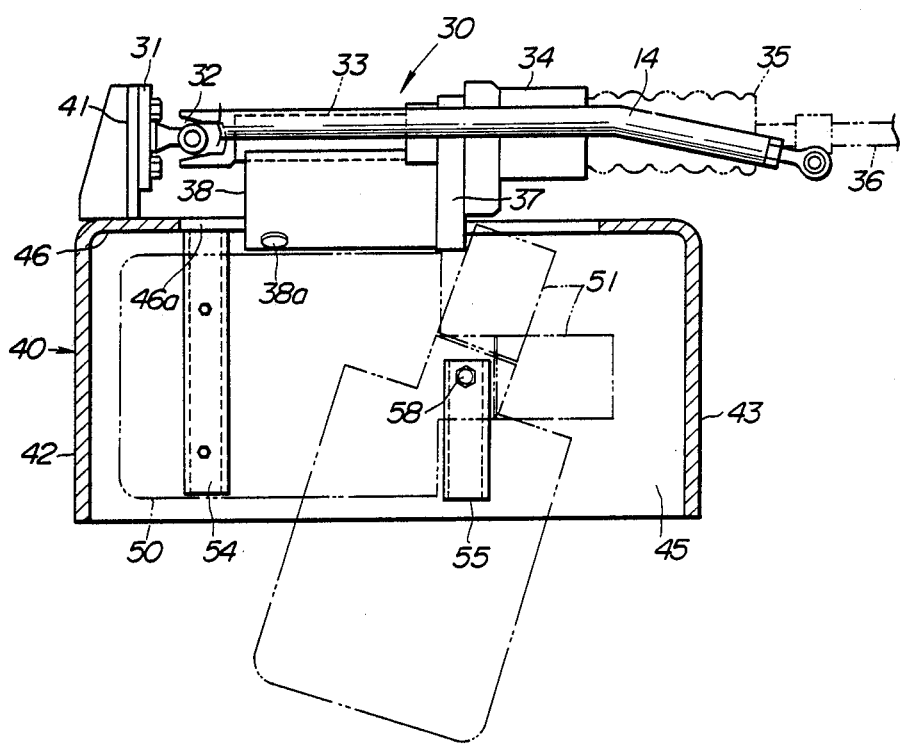
FIG. 4 is a plan view of the essential part of the parts-arrangement, depicting the process for checking or replacing the brushes o the electric motor employed in the power steering system.

In the following, steps for replacing the brushes of the power steering motor 38 will be described in order with reference to FIGS. 2 and 4.

1. The lid 47 is opened;
2. The bolt 58 is loosened and the other two bolts 56 and 57 are disconnected from the motor mounting bracket 53;
3. As is seen from FIG. 4, the motor mounting bracket 53 is turned outward about the loosened bolt 58 thereby to provide in the motor box 40 a sufficient space for manipulation work;
4. Hands of an operator are inserted into the motor box 40 and into the opening 46a of the box 40 for disconnecting the brush holder 38a from the motor 38. Old brushes on the holder 38a are replaced with new ones;
5. The holder 38a with the new brushes is properly fitted to the motor 38 and then the motor mounting bracket 53 is returned to its original right position in the motor box 40;
6. The bolts 56 and 57 are fitted to the bracket 53 and fastened and the bolt 58 is fastened; and
7. Finally, the lid 47 is closed.

In the following, advantages of the present invention will be itemized.

1. Checking and replacement of the brushes of the power steering motor 38 can be easily carried out. In the prior art, it has been necessary to dismantle the battery unit 60 and/or the driver's seat of the vehicle when inspection and/or replacement of the brushes of the motor is necessary.
2. Because the cargo-handling motor 50 can be turned out together with the bracket 53 from the motor box 42, the checking and replacement of the brushes of the motor 50 can be easily carried out also.

3. Because the checking and replacement of the brushes of the power steering motor 38 can be made without dismantling the cargo-handling motor 50 from the vehicle body, the troublesome and dangerous work attendant on the motor dismantling is not required.

Although the above description is directed to an embodiment applied to an electric forklift truck, the present invention is applicable to a forklift truck driven by an internal combustion engine.

We claim:

1. A steerable industrial vehicle having a vehicle body, comprising:
    an electrically powered power steering system mounted in said vehicle body and including an electric motor which produces power for amplifying torque applied to a steering wheel;
    a cargo-handling motor mounted in said vehicle body at a position near the power steering electric motor, said cargo-handling motor producing power for handling a cargo;
    a box structure mounted in said vehicle body and housing therein said cargo-handling motor, said box structure including an inboard side wall facing said power steering electric motor, an outboard open side facing the outside of the vehicle and a lower wall securedly mounted on the vehicle body; and
    means for detachably connecting said cargo-handling motor to said lower wall of said box
    wherein the inboard side wall of the box structure is formed with an opening therein, said opening being so sized as to permit manual labor for changing a given part of said power steering electric motor.

2. A steerable industrial vehicle as claimed in claim 1, in which said means for detachably connecting comprises at least one bolt which serves as a pivot pin about which said cargo-handling motor is turnable.

3. A steerable industrial vehicle as claimed in claim 2, in which said means for detachably connecting further comprises:
    two channel members which are secured to longitudinally spaced portions of said lower wall of the box structure in a manner to extend across the same;
    an enlarged supporting bracket secured to the two channel members by means of bolts which include the pivot bolt; and
    shock absorbers each being interposed between said cargo-handling motor said enlarged supporting bracket.

4. A steerable industrial vehicle as claimed in claim 3, in which the, opening of said inboard side wall of said box structure is rectangular in shape.

5. A steerable industrial vehicle as claimed in claim 4, in which the rectangular opening of the box structure is so sized as to permit insertion of an operator' hands thereinto.

6. A steerable industrial vehicle as claimed in claim 5, in which said outboard open side of said box structure is equipped with a hinged lid so that the open side is closed by said lid.

7. A steerable industrial vehicle as claimed in claim 6, in which said power steering motor is provided with a detachable brush holder.

8. A steerable industrial vehicle as claimed in claim 7, in which said detachable brush holder is detachably fixed to said power steering motor at a position facing the rectangular opening of the inboard side wall of said box structure.

9. A steerable industrial vehicle as claimed in claim 1, in which said cargo-handling motor is of an electric motor.

10. A steerable industrial vehicle as claimed in claim 9, further comprising a vehicle driving electric motor which produces a power for driving said vehicle.

11. A power steering system for an industrial vehicle, comprising:
    a box structure enclosing a power steering electric motor, said box structure mounted on a vehicle support member and including an inboard side wall attached to the support member, a lower wall and an outboard open side, said inboard side wall having an opening formed therein, said opening being so sized as to permit manual labor for changing a given part of said power steering electric motor;
    electric motor means mounted in said box structure for producing power for amplifying torque applied to an associated steering wheel;
    a cargo-handling motor mounted in said box structure at a position near the electric motor means, said cargo-handling motor producing power for handling cargo; and
    means for detachably connecting said cargo-handling motor to said lower wall of said box structure.

* * * * *